United States Patent [19]

Carmack

[11] Patent Number: 4,763,683

[45] Date of Patent: Aug. 16, 1988

[54] BREAKAWAY COUPLING FOR A COAXIAL FUEL SUPPLY HOSE

[75] Inventor: Paul D. Carmack, Tipp City, Ohio

[73] Assignee: Catlow, Inc., Tipp City, Ohio

[21] Appl. No.: 98,080

[22] Filed: Sep. 21, 1987

[51] Int. Cl.⁴ .............................................. F16L 37/28
[52] U.S. Cl. .............................. 137/68.1; 137/614.01; 137/614.04; 137/594; 141/285; 141/346
[58] Field of Search ............. 137/614.04, 594, 614.01, 137/68.1; 141/285, 346; 285/2

[56] References Cited

U.S. PATENT DOCUMENTS

| | | | |
|---|---|---|---|
| 3,171,448 | 3/1965 | Fromm | 141/346 |
| 3,211,178 | 10/1965 | Kiszko | 137/614.04 |
| 3,513,887 | 5/1970 | Limandri | 141/346 |
| 3,719,194 | 3/1973 | Anderson et al. | 137/614.03 |
| 3,788,348 | 1/1974 | Johnson | 137/614.04 |
| 3,976,100 | 8/1976 | Souslin | 141/346 |
| 4,617,975 | 10/1986 | Rabushka et al. | 285/2 |
| 4,674,525 | 6/1987 | Richards et al. | 137/68.1 |

*Primary Examiner*—A. Michael Chambers
*Attorney, Agent, or Firm*—Jacox & Meckstroth

[57] ABSTRACT

A first valve body has a tubular portion which releasably connects with a second valve body, and each valve body defines a center fuel supply passage in which a movable valve closure member is spring biased against an annular seat. Each valve body also defines a set of circumferentially spaced arcuate fuel vapor passages spaced outwardly from the corresponding fuel passage, and corresponding vapor passages within the valve bodies are connected by an annular chamber within the tubular body portion. Each fuel passage receives a closure ring which cooperates with an internally threaded end portion of the valve body for threadably receiving a coaxial fuel fitting, and resilient rings form fluid-tight seals between corresponding fuel and vapor passages.

4 Claims, 1 Drawing Sheet

BREAKAWAY COUPLING FOR A COAXIAL FUEL SUPPLY HOSE

BACKGROUND OF THE INVENTION

In the art of releasable or breakaway couplings for connecting a flexible fluid supply hose to another hose or fitting, for example, as disclosed in U.S. Pat. Nos. 3,719,194; 3,788,348; 4,617,975 and 4,674,525, it is common to use two mating valve bodies each of which encloses a spring-biased valve closure member. When the valve bodies are coupled together, both of the valve closure members are shifted to open positions against corresponding compression springs. When the valve bodies are separated, the closure members engage corresponding annular seats in order to close the fluid passages within the valve bodies. The valve bodies are releasably connected or coupled together by some means which fractures or releases when the valve bodies are subjected to a predetermined pulling force. As shown in above mentioned U.S. Pat. No. 4,617,975, such a force may be produced on the valve bodies when the coupling is used in a fuel supply hose extending to a dispensing nozzle, and the nozzle and hose are inadvertently pulled by a motor vehicle.

In some installations of a fuel supply system wherein a dispensing nozzle is connected by a flexible hose to a fuel pump, it has been found desirable to provide for collecting the fuel vapors which are emitted from a motor vehicle fuel tank as the tank is being filled with fuel. The vapors are sucked through a special dispensing nozzle which is connected to a coaxial fuel supply hose having an inner passage for supplying fuel and an outer annular passage for directing fuel vapor from the vehicle fuel tank back to the fuel dispensing pump. The reasons for returning the fuel vapor from the vehicle fuel tank to the fuel supply pump is to provide for a safer environment for the person dispensing the fuel into the tank and also to reduce pollution within the atmosphere.

SUMMARY OF THE INVENTION

The present invention is directed to an improved breakaway coupling which is particularly suited for use with a coaxial fuel supply hose and which is not only dependable and durable in operation but also economical to manufacture. In addition, the coaxial coupling of the invention is compact in design so that the coupling is only slightly larger than the coaxial hose. The coupling further provides for positively closing the fuel supply passages within the coupling sections or bodies when the bodies are separated and for positively connecting the corresponding fuel and fuel vapor passages within the fuel supply hoses when the bodies are coupled together.

In accordance with one embodiment of the invention, a breakaway coupling generally includes a set of interfitting tubular valve bodies each of which has a center fuel supply passage and a set of arcuate fuel vapor passages spaced circumferentially around the fuel supply passage. Each fuel supply passage encloses a valve closure member which is biased towards a closed position by a compression spring extending from a sealed closure ring inserted into the fuel supply passage. When the coupling or valve bodies are connected together, they cooperate to define an annular sealed vapor chamber for connecting the vapor passages within the valve bodies, and the valve closure members are shifted to open positions for connecting the fuel supply passages within the valve bodies.

Other features and advantages of the invention will be apparent from the following description, the accompanying drawing and the appended claims.

DESCRIPTION OF THE PREFERRED EMBODIMENT

Figure 1:
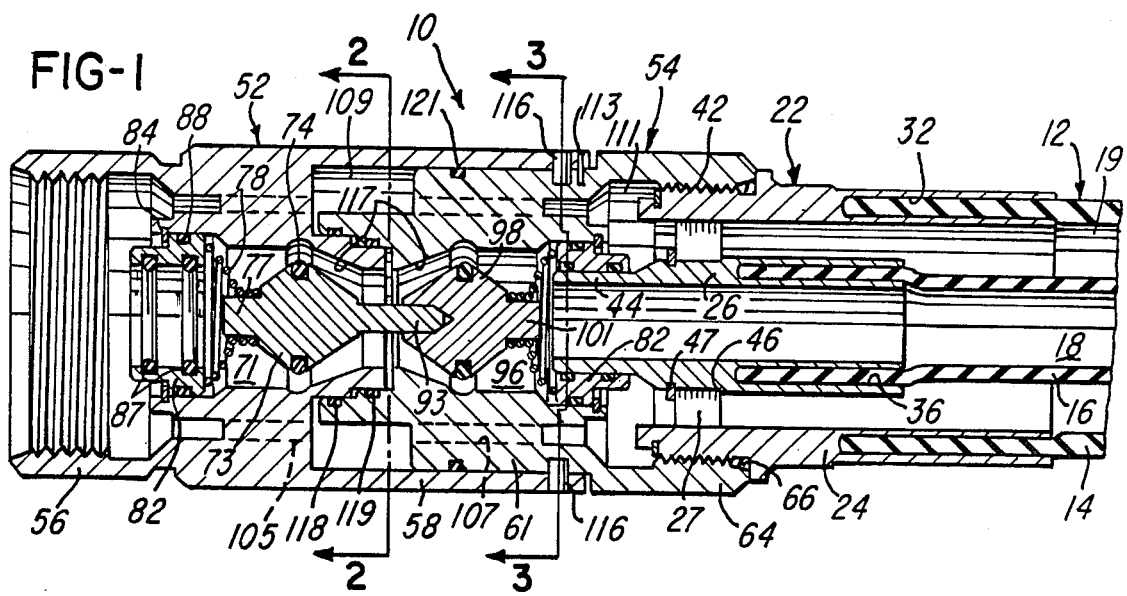
FIG. 1 is an axial section of an assembled coaxial breakaway coupling constructed in accordance with the invention and shown connected to a coaxial fuel supply hose.

Referring to FIG. 1, a coaxial breakaway hose coupling 10 is particularly suited for connecting opposing end portions of two flexible coaxial fuel supply hoses such as the hose 12 which includes an outer rubber-like flexible hose or tube 14 surround an inner flexible rubber-like hose or tube 16. The inner tube 16 defines a fuel supply passage 18, and the tubes 14 and 16 define therebetween an annular fuel vapor return passage 19.

A coaxial fitting 22 is secured to the end portions of the tubes 14 and 16 and is preferably formed of metal. The fitting 22 includes an annular outer section 24 and an inner tubular section 26 which is spaced concentrically within the outer section 24 by a set of circumferentially spaced radial ribs 27 formed as an integral part of the section 24. The outer fitting section 24 has an annular cavity 32 which receives an end portion of the outer flexible tube 14 and is crimped against the end portion. Similarly, the inner section 26 of the fitting 22 has an annular cavity 36 which receives an end portion of the inner tube 16 and is crimped against the end portion. The outer section 24 of the fitting 22 has external threads 42, and the inner section 26 of the fitting 22 has a tubular end portion 44 with a cylindrical outer surface. The inner section 26 also has an annular shoulder 46 which cooperates with a retaining ring 47 to secure the section 26 within the ribs 28.

The coupling 10 includes a first tubular valve section or body 52 and a second tubular valve section or body 54 each of which is formed of metal, but may also be molded of a rigid plastics material. The valve body 52 includes an internally threaded end portion 56 having external flats to form a hexagonal outer surface. The body 52 also includes a tubular or cylindrical portion 58 which has a knurled outer surface and a cylindrical inner surface for receiving a mating cylindrical portion 61 of the valve body 54. The valve body 54 also has an internally threaded end portion 64 which has.external flats forming a hexagonal outer surface. The threaded portion 64 receives the external threads on the outer fitting section 24, and a captured resilient O-ring 66 forms a fluid-tight seal between the valve body 54 and the hose fitting 22.

Figure 2:
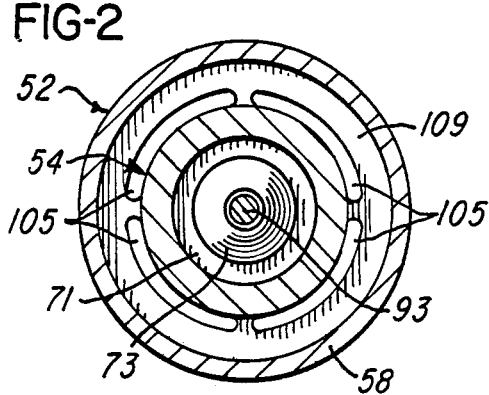
FIG. 2 is a radial section taken generally on the line 2—2 of FIG. 1.
Figure 3:
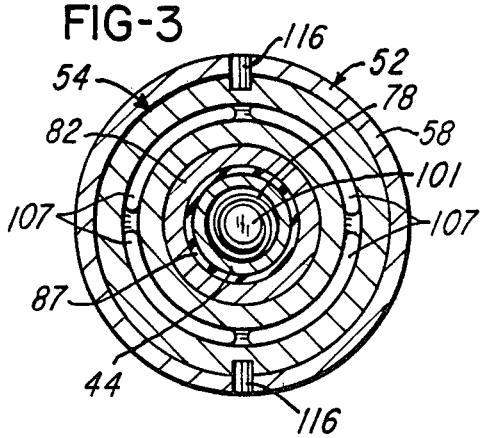
FIG. 3 is a radial section taken generally on the line 3—3 of FIG. 1.

As shown in FIGS. 1 and 2, the valve body 52 has an inner fuel supply passage 71 which receives a spindle-type valve closure member 73 having an external groove for receiving a resilient O-ring 74. The closure member 73 has a cylindrical end portion 77 which receives the smaller end portion of a conical-type compression spring 78. The larger end portion of the spring 78 engages an annular fitting or closure ring 82 which is retained within a cylindrical bore of the valve body 52 by a retaining ring 84. The closure 82 carries a pair of internal resilient O-rings 87 and an external O-ring 88 which forms a fluid-tight seal between the closure ring 82 and the valve body 52. The valve closure member 73 also has a cylindrical stem portion 93 having a tapered end portion.

The valve body 54 also forms or defines an internal fuel supply passage 96 which receives a spindle-type valve closure member 98 having a center bore for slidably receiving the stem portion 93 of the valve closure member 73 to maintain the valve members in axial alignment. The valve member 98 also carries a resilient O-ring 74 and has a cylindrical end portion 101 which receives another conical compression sping 78. The valve body 54 also has a cylindrical bore which receives another closure ring 82. The ring 82 is sealed to the valve body 54 by resilient O-ring 88 and is secured by a retaining ring 84. The closure ring 82 also carries a pair of axially spaced resilient O-rings 87 which form a fluid-tight seal between the closure ring 82 and the projecting cylindrical end portion 44 of the connecting hose fitting 22.

Referring to FIG. 2, the valve body 52 further defines a set of circumferentially extending arcuate fuel vapor passages 105 which are spaced radially outwardly from the inner fuel supply passage 71. Similarly, the valve body 54 has a corresponding set of vapor passages 107 which align axially with the passages 105 and are connected by an annular vapor chamber 109 defined in part by the cylindrical portion 58 of the valve body 52. Each of the vapor passages 105 and 107 extends circumferentially about 80°, and the passages 107 within the valve body 54 are connected to the annular vapor passage within the fitting 22 by an annular chamber 111 defined within the end portion 64 of the valve body 54.

When the coupling sections or assembled valve bodies 52 and 54 are coupled together, a radial pin 113 carried by the valve body 54 extends into an alignment slot within the end of the valve body portion 58. The valve bodies 52 and 54 are also connected by a pair of diametrically opposed shear pins 116 which are formed of a material adapted to shear when a predetermined axial pulling force is exerted on the valve bodies in a direction to separate the valve bodies. If it is desired to have the valve body 54 rotate within the valve body 52, the alignment pin 113 may be omitted, and the shear pins 116 may be replaced by an annular C-shaped ring having a circular cross section and confined within opposing semi-circular circumferential grooves within the valve bodies 52 and 54.

Figure 4:
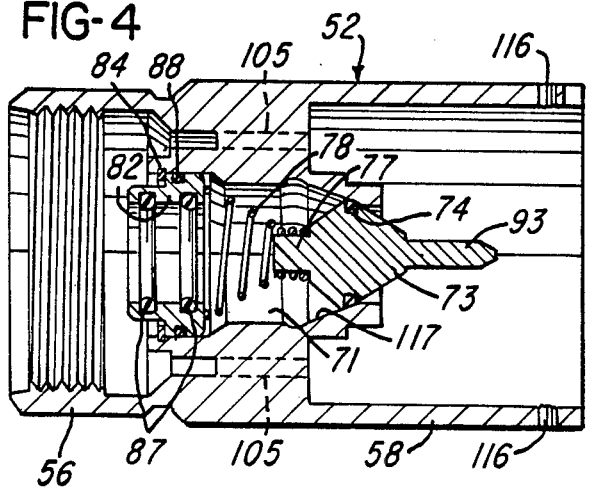
FIGS. 4 and 5 are axial sections of the assembled coupling bodies after the bodies are separated.
Figure 5:
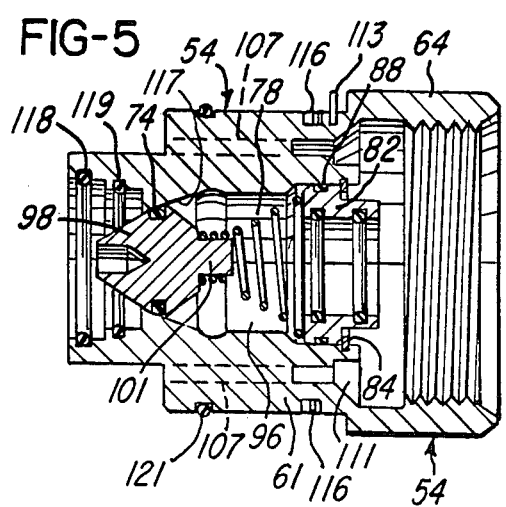

As illustrated in FIGS. 4 and 5, when the valve bodies 52 and 54 are separated by a predetermined pulling force which is effective to shear the pins 116, the valve members 73 and 98 within the valve bodies move to their closed positions where the O-rings 74 engage corresponding tapered valve seats 117 within the valve bodies. The corresponding fuel supply passages 71 and 96 within the valve bodies 52 and 54, respectively, are thereby closed to prevent the escape of liquid fuel from the fuel passages. When the valve bodies 52 and 54 are connected or coupled together, as shown in FIG. 1, a pair of resilient O-rings 118 and 119 form fluid-tight seals for connecting the fuel supply passages 71 and 96, and a resilient O-ring 121 forms a fluid-tight seal between the valve bodies so that fuel vapor does not escape the annular chamber 109.

From the drawing and the above description, it is apparent that a coaxial coupling constructed in accordance with the present invention, provides desirable features and advantages. As one primary feature, the coupling 10 is simple and economical to construct or manufacture. In addition, the coupling 10 is compact in overall size and provides for desirable flow rates of liquid fuel through the center fuel passages and of fuel vapor through the arcuate passages 105 and 107 and connecting chamber 109. Furthermore, when the assembled valve bodies 52 and 54 are separated after a breakaway of the coupling 10, the valve member 73 and 98 within the corresponding valve bodies 52 and 54 are protected from being damaged by the surrounding portions of the valve bodies.

While the form of coupling herein described constitutes a preferred embodiment of the invention, it is to be understood that the invention is not limited to this precise form of coupling, and that changes may be made therein without departing from the scope and spirit of the invention as defined in the appended claims.

The invention having thus been described, the following is claimed:

1. A breakaway coupling device adapted for use with a flexbile coaxial fuel supply hose defining a liquid fuel supply passage and a surrounding annular fuel vapor return passage in coaxial relation, said device comprising a first valve body and a second valve body disposed with a common center axis, each of said valve bodies defining an axially extending inner liquid fuel passage and a plurality of axially extending vapor passages spaced outwardly from said fuel passage, each of said vapor passages within each of said valve bodies extending in an arcuate circumferential direction around a portion of the corresponding said liquid fuel passage, each of said valve bodies having a frusto-conical valve seat defining a portion of said fuel passage, each of said valve bodies having a threaded annular end portion for releasably connecting said valve body to a coaxial fuel supply and vapor fitting, a corresponding valve closure member disposed within each of said fuel passages for axial movement between a closed position engaging the corresponding said valve seat and a retracted open position, a compression spring within each of said fuel passages for supporting the corresponding said valve member centrally within said fuel passage and for urging said valve member towards said closed position, a tubular member on one of said valve bodies and receiving the other said valve body, means for releasably connecting said tubular member to the other said valve body in a coupling position and providing for separating said valve bodies in response to a predetermined axial pulling force on said valve bodies, said tubular member defining an annular vapor chamber interconnecting all of said arcuate vapor passages in both of said valve bodies when said valve bodies are in said coupling position, means for sealing said vapor passages and vapor chamber from said fuel passages when said valve bodies are in said coupling position, and means for sealing said vapor passages within each said valve body and the threadably connected fitting from the corresponding said fuel passages.

2. A coupling device as defined in claim 1 wherein each said vapor passage extends circumferentially at least about eighty degrees.

3. A coupling device as defined in claim 1 wherein each of said valve bodies includes means defining a cylindrical bore, said fitting including a cylindrical portion projecting axially into said bore, and a set of resilient sealing rings forming a fluid-tight connection between said means defining said bore and said cylindrical portion of said fitting.

4. A coupling device as defined in claim 1 wherein said tubular means defining said annular vapor chamber comprises an integral tubular portion of said one valve body.

* * * * *